United States Patent [19]
Ryu

[11] Patent Number: 4,523,554
[45] Date of Patent: Jun. 18, 1985

[54] METAL AND CERAMIC ASSEMBLY

[75] Inventor: Hideo Ryu, Tagata, Japan

[73] Assignee: Usui Kokusai Sangyo Kabushiki Kaisha, Shizuoka, Japan

[21] Appl. No.: 542,105

[22] Filed: Oct. 14, 1983

[30] Foreign Application Priority Data

Oct. 22, 1982 [JP] Japan ................. 57-185882

[51] Int. Cl.³ .................... F02F 1/00; F02B 77/02
[52] U.S. Cl. .................... 123/193 C; 123/668
[58] Field of Search ........ 123/193 R, 193 H, 193 CH, 123/668, 669, 657, 193 C, 193 CP

[56] References Cited

U.S. PATENT DOCUMENTS

| | | | |
|---|---|---|---|
| 3,657,078 | 4/1972 | Schweikher | 123/193 C |
| 3,786,795 | 1/1974 | Kaneko et al. | 123/193 H |
| 4,276,331 | 6/1981 | Bothwell | 60/687 |
| 4,398,527 | 8/1983 | Rynbrandt | 123/193 C |

*Primary Examiner*—Craig R. Feinberg
*Attorney, Agent, or Firm*—Anthony J. Casella; Gerald E. Hespos

[57] ABSTRACT

A cylindrical metal and ceramic assembly comprising a metal base and a ceramic member fitted tightly within the metal base. A plurality of grooves extending substantially along the entire length of the assembly are provided in at least one of the inner surface of the metal base and the outer surface of the ceramic member which contact each other. Each of the inner and outer surfaces of the ceramic member has an impregnated layer having a very fine structure composed of chromium oxide, or a mixture of silica, chromium oxide and alumina. A typical example of the assembly is a liner for a piston in an internal combustion engine.

13 Claims, 6 Drawing Figures

PRIOR ART

METAL AND CERAMIC ASSEMBLY

BACKGROUND OF THE INVENTION

1. Field of the Invention

This invention relates to an assembly comprising metal and ceramic material, more particularly, an assembly which comprises a metal member and a ceramic member joined thereto.

2. Description of the Prior Art

Various assemblies of metal and ceramic material are known. FIG. 6 shows, by way of example, a piston liner for an internal combustion engine. It comprises a cylindrical metal sleeve (11) and a cylindrical ceramic member (12) joined by shrink fitting or otherwise to the inner surface (13) of the metal sleeve. The ceramic member consists essentially of $Al_2O_3$, $ZrO_2$, $Si_3N_4$ or SiC. The metal sleeve and the ceramic member, however, have widely different coefficients of thermal expansion. If they are exposed to a high temperature for a long time, the shrink fit is likely to become loose, resulting in the displacement of the ceramic member from the metal base. Shrink fitted assemblies also require a high degree of dimensional accuracy and complicated treatment of the individual parts which clearly places a limitation on productivity.

SUMMARY OF THE INVENTION

One object of this invention is to enable a secure joint to be made between the metal and ceramic material in an assembly.

According to the present invention we propose an assembly comprising metal and ceramic material in which a metal member and a ceramic member, are fitted tightly together for example, one within the other, and having on the surface of the ceramic member, at least at the interface between the two members, an impregnated layer of chromium oxide, or a mixture of silica, chromium oxide and fused alumina.

When the ceramic member is, for example, a cylinder shrink-fitted within a metal sleeve, both the inner and outer surface of the ceramic member may have impregnated surface layers.

We also propose a method of making an assembly comprising a metal member and a ceramic member tightly fitted together with surfaces thereof in contact at an interface, and comprising the step of introducing an impregnant to form on the surface of the ceramic member at least at the interface, an impregnated layer containing chromium oxide or a mixture of silica chromium oxide and fused alumina. Preferably, at least one of the metal and ceramic surfaces at the interface is provided with a plurality of grooves enabling the introduction and penetration of an impregnant to form the impregnated ceramic layer between the metal base and the ceramic member. The impregnated layers of $Cr_2O_3$, or a combination of $SiO_2$, $Cr_2O_3$ and $Al_2O_3$, form a very fine structure by chemical bonding when heated.

The grooves and the impregnated ceramic layers enable a strong bond which is never likely to become loose when the assembly is exposed to a high temperature. The interior of the ceramic member disposed between the impregnated layers remain porous, and maintains satisfactory heat-insulating property.

Other features of the present invention are set forth in the appendent claims.

DESCRIPTION OF THE DRAWINGS

Embodiments of the invention will now be described by way of example with reference to the accompanying drawings in which.

DETAILED DESCRIPTION OF PREFERRED EMBODIMENTS

Figure 1:
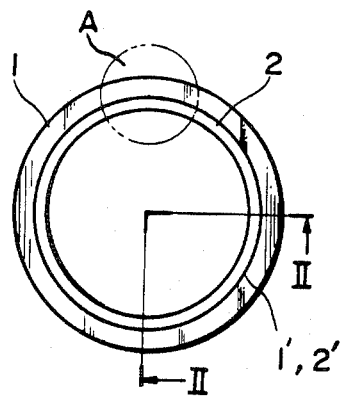
FIG. 1 is a plan view of a piston liner embodying this invention.
Figure 2:
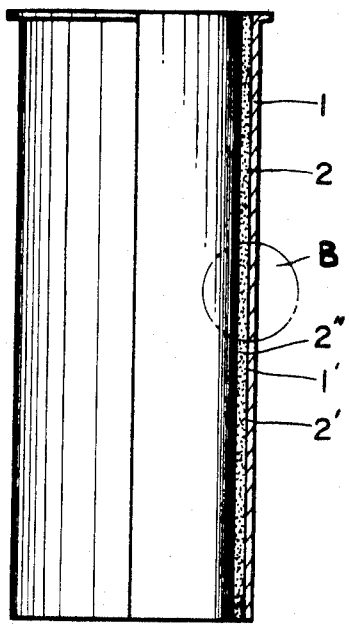
FIG. 2 is a cross-section view taken on II—II of FIG. 1.
Figure 3:
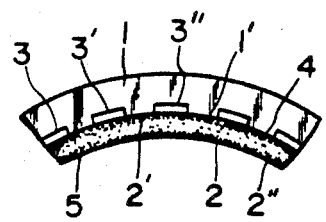
FIG. 3 is an enlarged view of portion A in FIG. 1.
Figure 5:
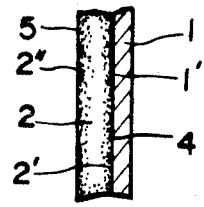
FIG. 5 is an enlarged view of portion B in FIG. 2.
Figure 6:
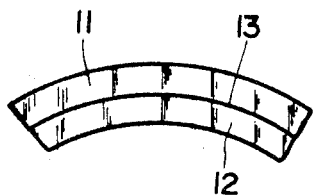
FIG. 6 is a fragmentary plan view of a conventional assembly.

The piston liner shown in FIGS. 1 to 3 comprises a cylindrical metal base 1 and a cylindrical ceramic member 2 composed of, for example, $Al_2O_3$, $ZrO_2$, $Si_3N_4$, or SiC and fitted within the metal base 1. The inner surface 1' of the metal base 1 contacting the outer surface 2' of the ceramic member 2 has a plurality of longitudinally extending grooves 3, 3', 3''—which extend substantially along the entire length of the metal base 1. The opposite surfaces 2' and 2'' of the ceramic member 2 are each formed with an impregnated ceramic layer as shown at 4 and 5 in FIGS. 3 and 5. The layers 4 and 5 are composed of $Cr_2O_3$, or a mixture of $SiO_2$, $Cr_2O_3$, and $Al_2O_3$, and have a very fine structure.

The layers 4 and 5 are formed by the immersion of the metal and ceramic assembly in a carefully mixed solution obtained by adding chromium oxide ($Cr_2O_3$) powder or a mixed powder of silica ($SiO_2$), chromium oxide ($Cr_2O_3$) and fused alumina ($\alpha$-$Al_2O_3$) into a concentrated aqueous solution of a soluble chromium compound (for example, $H_2CrO_4$). The grooves 3, 3', 3'' . . . enable penetration of the solution to form the impregnated layer 4 between the metal base 1 and the ceramic member 2. The assembly is then heated to a temperature of, say, 400° C., whereby the particles with which the opposite surfaces of the ceramic member 2 have been impregnated are chemically bonded with each other, and also with chromium oxide present in the inner surface 1' of the metal base 1 to form a very fine structure in the layers 4 and 5.

Figure 4:
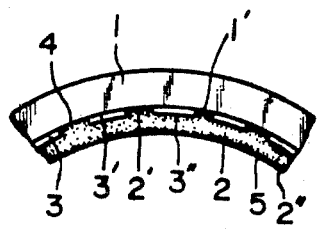
FIG. 4 is a view similar to FIG. 3, but showing another embodiment of this invention.

FIG. 4 shows a modification in which grooves 3, 3+, 3'' . . . are provided in the outer surface 2' of the ceramic member 2. It is also possible to provide these grooves in both in the inner surface of the metal base 1 and the outer surface of the ceramic member 2, though this arrangement is not shown in the drawings. The grooves may be straight, spiral or slanting, or of any other form including the shape of a net.

I claim:

1. A metal and ceramic assembly comprising:
a first layer comprising a ceramic material;
a second layer on a surface of and unitary with said first layer, said second layer comprising said ceramic material having in addition contained therein an impregnant selected from the group consisting of (a) chromium oxide and (b) a mixture of silica, chromium oxide and fused alumina; and
a third layer comprising a metal material, said third layer being adjacent said second layer and being secured thereto by said impregnant.

2. An assembly as in claim 1 further comprising a fourth layer disposed adjacent to and unitary with the first layer but on the side thereof opposite said second layer, said fourth layer being comprised of substantially identical material as said second layer.

3. An assembly as in claim 2, wherein said assembly is of generally cylindrical tubular construction, said third layer being disposed outwardly of said first, second and fourth layers.

4. An assembly comprising a metal member having an inner surface and an outer surface, and a ceramic member fitted tightly in the metal member, the ceramic member having an inner surface and an outer surface, the outer surface of the ceramic member contacting the inner surface of the metal member, at least one of the inner surface of the metal member and the outer surface of the ceramic member having a plurality of grooves extending substantially along the entire length of the assembly, each of the inner and outer surfaces of the ceramic member defining impregnated interface portion said impregnated interface portion further comprising a very fine structure composed of a material selected from the group consisting of chromium oxide and a mixture of silica, chromium oxide and fused alumina wherein said interface portion acts as means for bonding the metal and ceramic members together.

5. An assembly according to claim 4, wherein the ceramic member is composed of a material selected from the group consisting of $Al_2O_3$, $ZrO_2$, $Si_3N_4$ and SiC.

6. An assembly according to claim 4, wherein the metal member and the ceramic member are cylindrical.

7. An assembly according to claim 4, wherein the metal member and the ceramic member form a liner for a piston in an internal combustion engine.

8. An assembly comprising a metal member and a ceramic member, said metal and ceramic members being fitted tightly together, a surface of the ceramic member adjacent the metal member defining an impregnated interface portion, said impregnated interface portion of said ceramic member further comprising therein an impregnant selected from the group consisting of (a) chromium oxide and (b) a mixture of silica, chromium oxide and fused alumina, wherein the impregnated interface portion securely acts as means for bonding the metal and ceramic members together.

9. An assembly according to claim 8 wherein the ceramic member further comprises an interior portion adjacent said impregnated layer, said interior portion being substantially free of the impregnant.

10. An assembly according to claim 8 wherein, at least one of the metal and ceramic members is formed with grooves adjacent an interface therebetween.

11. An assembly according to claim 8, wherein the metal member has an inner and an outer surface and the ceramic member is fitted tightly within the metal member and has an inner surface and an outer surface in contact with the inner surface of the metal member at the interface.

12. An assembly according to claim 8, wherein the metal member has an inner and an outer surface and the ceramic member is fitted tightly within the metal member and has an inner surface and an outer surface in contact with the inner surface of the metal member at an interface.

13. An assembly according to claim 12 wherein the portion of the assembly adjacent the inner surface of the ceramic member is impregnated with the impregnant.

* * * * *